United States Patent [19]
Aggarwal et al.

[11] Patent Number: 5,943,478
[45] Date of Patent: Aug. 24, 1999

[54] SYSTEM FOR IMMEDIATE POPUP MESSAGING ACROSS THE INTERNET

[75] Inventors: Sudhanshu Aggarwal, Cambridge; Peter Beebee, Boston, both of Mass.; Kleanthes Koniaris, Menlo Park, Calif.; Rajeev Surati, Cambridge, Mass.

[73] Assignee: Flash Communications, Inc., Boston, Mass.

[21] Appl. No.: 08/832,758

[22] Filed: Apr. 4, 1997

[51] Int. Cl.⁶ ..................................................... G06F 11/00
[52] U.S. Cl. ................ 395/187.01; 395/186; 395/200.59
[58] Field of Search .............................. 395/186, 187.01, 395/188.01, 200.59; 380/3, 4, 23, 25; 345/326, 329, 335, 340; 340/825.31, 825.34

[56] References Cited

U.S. PATENT DOCUMENTS 5,550,984  8/1996  Gelb .................................... 395/200.17
5,590,266 12/1996  Carson et al. ........................... 395/340
5,699,513 12/1997  Feigen et al. ....................... 395/187.01

OTHER PUBLICATIONS

DellaFerra et al., The Zephyr Notification Service, Usernet Conference, Feb. 1988.

LaMacchia, David, "The iFlame Client–Based Instantaneous Datagram Communications Substrate", SB Thesis, Massachusetts Institute of Technology, May 1996.

*Primary Examiner*—Robert W. Beausoliel, Jr.
*Assistant Examiner*—Pierre E. Elisca
*Attorney, Agent, or Firm*—Workman, Nydegger, Seeley

[57] ABSTRACT

A system for sending immediate popup messages between Internet users, the system including a user interface for sending messages and displaying messages in popup windows; a method and infrastructure for continuously tracking and reporting the online status of users, the infrastructure comprising servers and client software; and a method for communicating to users behind firewalls.

7 Claims, 9 Drawing Sheets

SYSTEM FOR IMMEDIATE POPUP MESSAGING ACROSS THE INTERNET

BACKGROUND OF THE INVENTION

The invention relates to a system for performing immediate point-to-point messaging over the Internet.

Communication over the Internet takes on several forms—principally e-mail, chat, video and audio. These forms of communication are used in a variety of different contexts. E-mail is generally not perceived as "real-time" or "immediate"; messages may be read hours or days after they are sent. Chat is principally used as a social medium or for information sharing—not for point-to-point communication. Video and audio are both real-time, but they are both relatively difficult to use, and widespread acceptance requires improvements in existing technology and user interfaces.

There exists, on a limited basis, an additional form of communication—popup messaging. A user A can send a popup message to another user B; the message immediately "pops up" on B's screen. The prototypical popup messaging system is the Zephyr system on MIT's campus computer network, Athena. Zephyr permits any Athena user to send popup messages to any other Athena user, but not to any user across the Internet. WinPopup by Microsoft Corp. is a Windows utility to send popup messages between users; however, WinPopup, too, only permits messaging between users on the same network, and is not capable of sending messages across the Internet. Further, both Zephyr and WinPopup are not scaleable to high user volumes; they are designed for self-contained environments with a small or moderate number of users.

Firewalls are machines commonly used for enforcing corporate network security policies; at least half of all Internet users and most business users connect to the Internet through a firewall. Firewalls represent a key impediment for real-time communication between Internet users. Firewall designs generally prohibit external entities on the Internet from connecting to internal entities protected by the firewall. While this is designed to prevent external entities from maliciously manipulating internal entities, it also has the side-effect of preventing asynchronous communication to an internal entity. Current forms of real-time Internet messaging are generally incapable of working through a firewall, without explicit firewall policy modifications by systems administrators.

SUMMARY OF THE INVENTION

In general, in one aspect, the invention features a system for popup messaging between a plurality of Internet users. The invention includes a set of servers for managing, storing and routing communication between users, client software associated with individual users, a message protocol that defines the format and effect of each message in the system, and a user interface for sending messages and receiving popup messages.

Preferred embodiments include the following features. The set of servers includes an unlimited set of Home Servers that permanently "own" individual users, and a Global Server that serves as a repository of permanent user information. The current status of each user is maintained by the user's Home Server. To send a popup message from one user to another, the sender's client first forwards the message to its Home Server, which then determines the identity of the recipient's Home Server, querying the Global Server if necessary. Subsequently, the sender's Home Server delivers the message to the recipient's Home Server, which then delivers the message to the recipient.

In general, in another aspect, the invention features a system for tracking the online status of users. The invention features a contact list of correspondents maintained by each user, a continuously updated client "window" informing the user of the online status of each correspondent in the contact list, and the ability to receive a notification when any correspondent in the contact list logs in or logs off.

Preferred embodiments include the following features. A user logs in by contacting his/her Home Server. The Home Server maintains a list of users who have the user on their contact list; upon user login, the Home Server notifies each of these users about the user's having logged in. Similarly, when the user logs off or otherwise aborts, the users Home Server notifies all interested users about the user's having logged off.

In general, in still another aspect, the invention features a method for sending an asynchronous message in real time to a recipient behind a firewall. In preferred embodiments, when a user logs in by contacting his/her Home Server, the Home Server opens a dedicated "back connection" to the user, over which all subsequent messages are sent from the Home Server to the user. The Home Server employs a "MIME-multipart push" technique for instantly sending messages as parts of an arbitrarily long multipart message. The Home Server also regularly sends blank messages over the connection to keep the firewall connection active.

One advantage of the invention is that it is capable of scaling to arbitrarily large numbers of users over the Internet. Other advantages and features will become apparent from the following description of the preferred embodiment and from the claims.

DESCRIPTION OF THE PREFERRED EMBODIMENT

Figure 1:
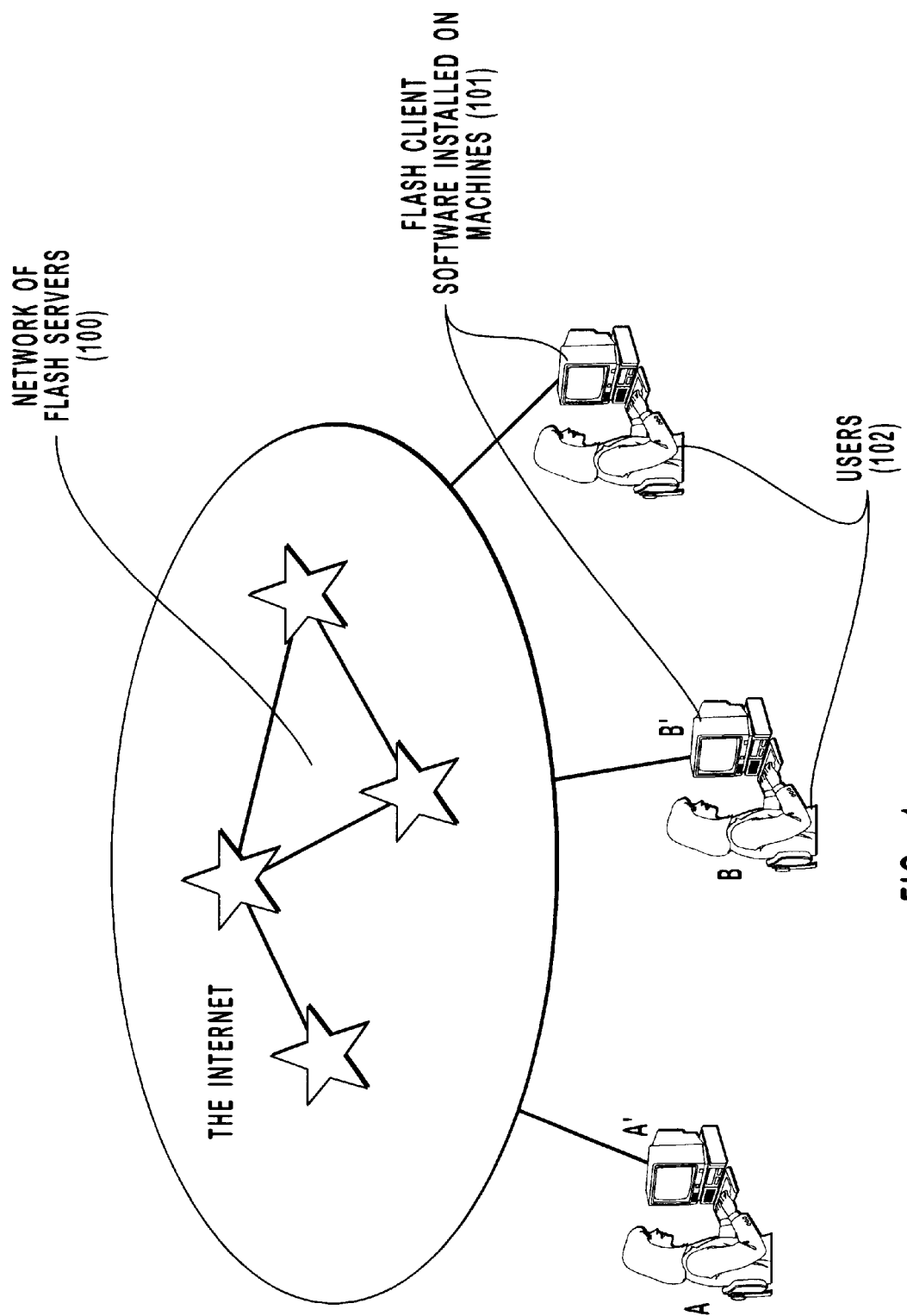
FIG. 1 shows the context of the system ("Flash") within the Internet.

Referring to FIG. 1, the Flash system consists of a network of Flash servers 100 interspersed through the Internet, and client software 101, with each user 102 possessing one instance of a client. When a user A sends a message to another user B, the client software for A, A', delivers the message, in general, to the network of Flash servers 100, which, after appropriate processing and routing, delivers it on to the client B' used by B. In the following discussion, the terms "user" and "client" will be used interchangeably for clarity; the meaning should follow from the context.

Figure 2:
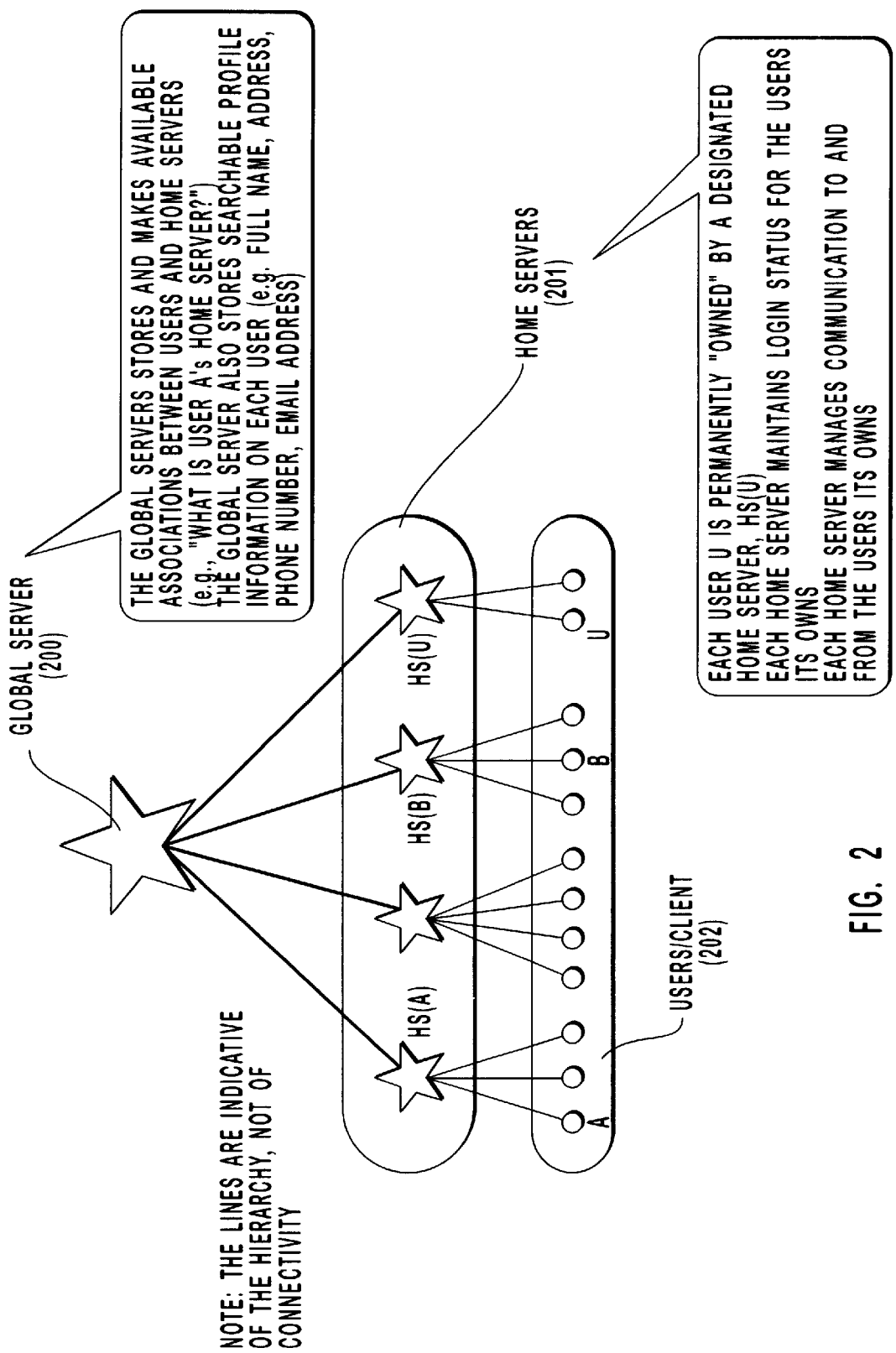
FIG. 2 shows the components of the Flash system, and the key functions performed by each component.

FIG. 2 illustrates the structure of the network of Flash servers, which consists of a single Global Server 200 and an arbitrarily large set of Home Servers 201. At the time of initial registration, each user U is permanently assigned a unique integer identifier UID(U), and is also assigned to a particular Home Server HS(U) chosen from within the set of Home Servers.

The Global Server 200 serves as a repository of all user information of a permanent nature. The most important function of the Global Server is to store the assignments of users to their Home servers; thus, it stores the mapping U→HS(U) for every user U registered with the Flash system. The other function is to store and provide searcheable profile information for each user, so that users can "find" other users. This profile information generally includes the full name, address, phone number, etc. for each user. This profile information enables, for instance, a user to search for any "Bob Jones" registered on the Flash system, or to search for all the Smiths living in Florida.

The purpose of a Home Server HS is to "own" a set of users-the set of users permanently assigned to HS. For any user U thus owned by it, a Home Server stores the current login status of U (i.e. "logged in" or "logged off"), manages all communication to and from U, and stores messages intended for U but which cannot be immediately delivered to U (e.g., if U is not logged on when someone sends U a message). It also stores a list of other users that U wishes to regularly keep in touch with (a "contact list"), and a list of users that have U on their contact list (a "contacter list").

There is no fundamental limit to the number of Home Servers in the Flash system; the system can handle an arbitrarily large number of Home Servers. Since each Home Server is designed to own at least 10,000 users, the Flash system scales up to an arbitrarily large number of users.

Given that Internet users number in the tens of millions, the Global Server must withstand millions of queries a day. As will be described later, the Home Server must constantly "poll" (send regular messages to) each of its active users. Consequently, both the Global Server and Home Server must be high-end machines. In the preferred embodiment, the Global Server is a 200 MHz dual-processor Pentium Pro with 256 MB RAM, a replicated 10-Gigabyte hard drive, and a 100 Mbps Ethernet card with a T-3 Internet connection. The Home Server is a 200-MHz dual-processor Pentium Pro with 128 MB RAM, a 4-Gigabyte hard drive, and a 10 Mbps Ethernet card with a T-1 Internet connection.

Figure 3:
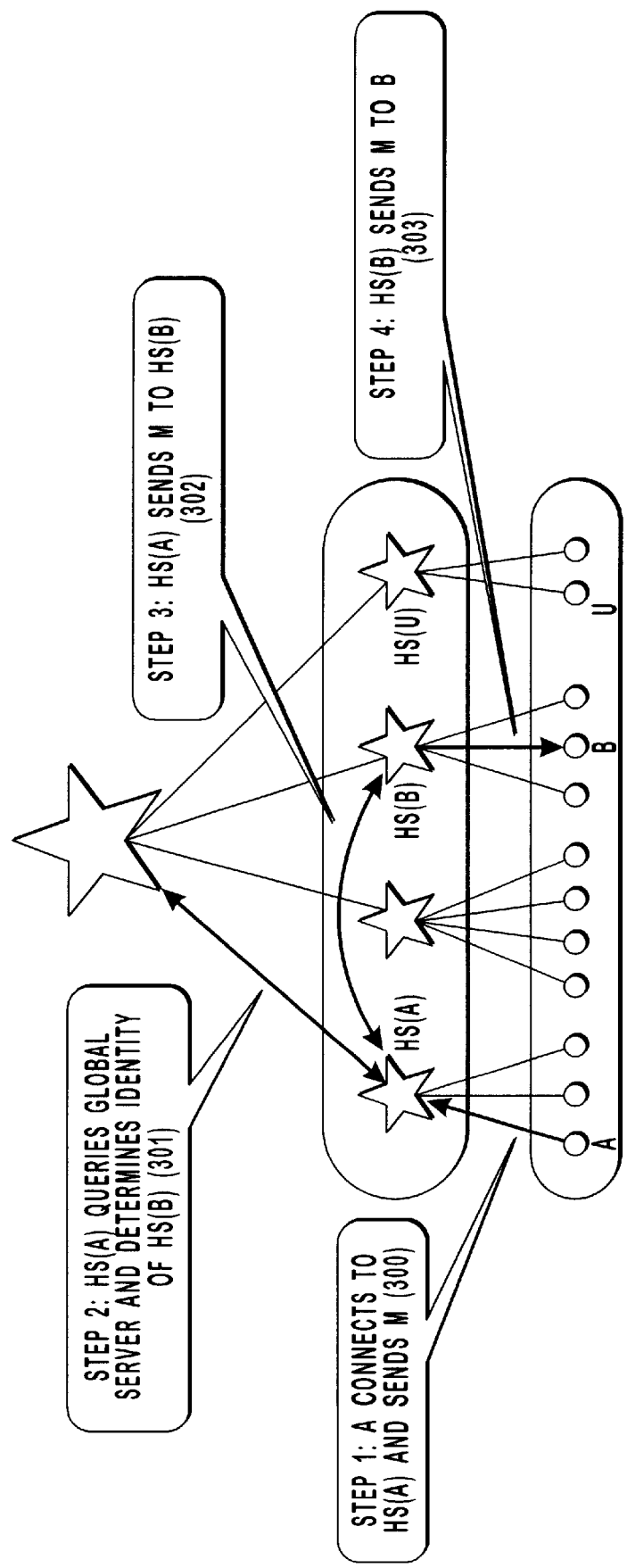
FIG. 3 shows the steps involved in sending a flash message from a user A to another user B.

FIG. 3 summarizes the operation of the Flash system with respect to sending messages from one user to another. When a user A sends a message M to a user B (by pressing the "Send" button on the message being composed), A's client connects to A's Home Server HS(A) and transmits M to it 300. Based on B's unique ID UID(B), HS(A) determines HS(B) as follows: if HS(A) is not already aware of HS(B), it queries the global server GS for the identity of HS(B) 301. HS(A) then connects to HS(B) and transmits M to HS(B) 302. HS(B) then determines whether B is logged in. If B is logged in, HS(B) transmits M to B 303, in a manner that will be described; if B is not logged in, HS(B) stores the message for B and delivers it to B as soon as B next logs in.

When the client B receives the message from HS(B), it opens a popup window on the user's screen using standard user interface techniques. For instance, on Windows systems, the client calls functions resident in the Microsoft Foundation Classes (MFC) supplied by Microsoft Corp., to create a window of a specified size, display it on the screen, overlay it on top of the other applications, and paint the message content as well as some action buttons (e.g. "Done", "Reply", etc.) on the window.

The last step 303 in the above-described sequence of operations for sending a message M from A to B—that of delivering the message to B—requires a special technique if B is behind a firewall. The Flash system incorporates this special technique by default, as described in the following section, thus enabling any user behind a firewall to seamlessly use the system as though they were directly connected to the network.

Figure 4A:
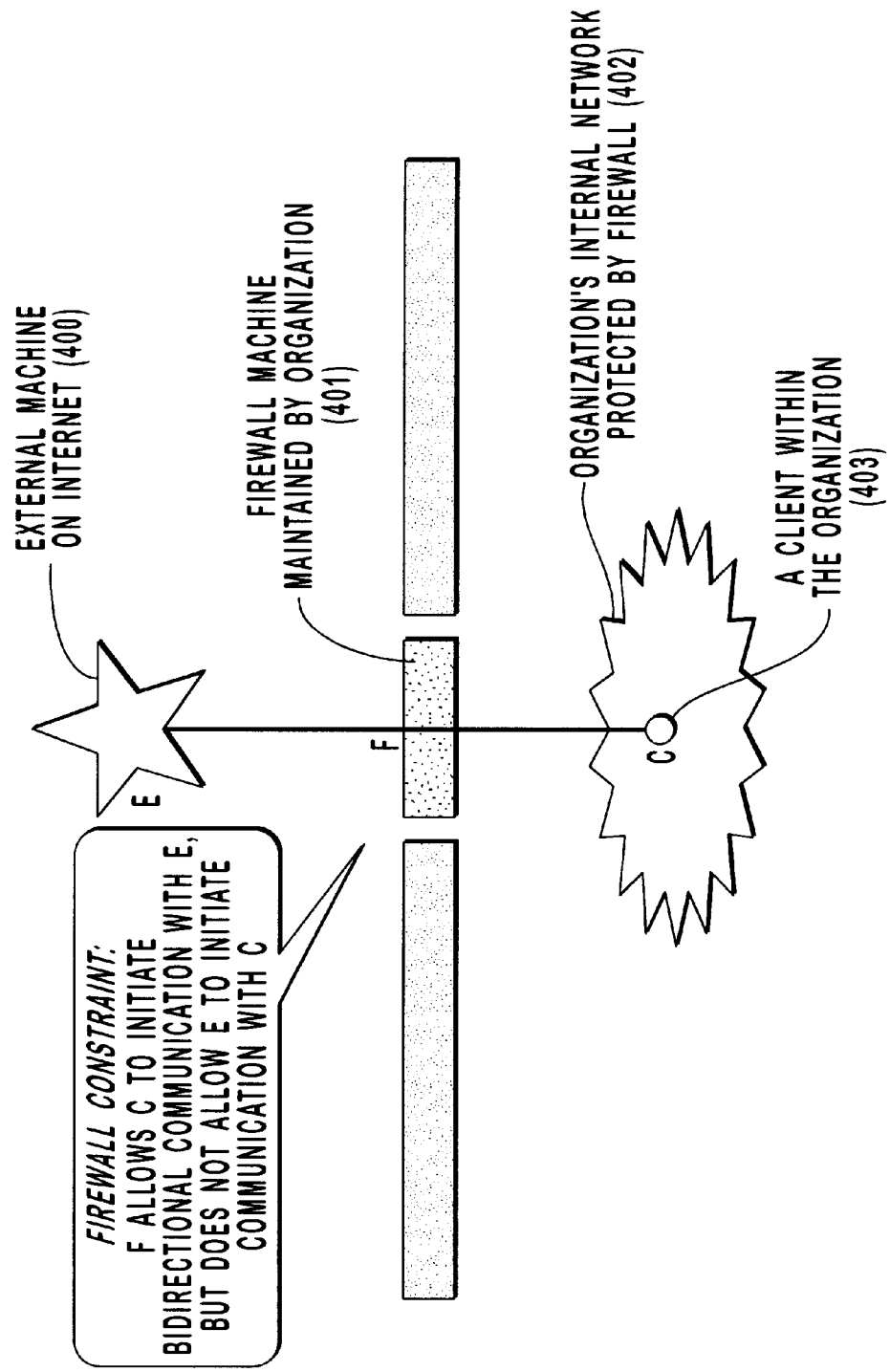
FIGS. 4A–E show the operation of a Flash client behind a firewall.

FIG. 4A depicts a client C 403, a firewall F 401 and a generic external machine E 400 outside the firewall that intends to deliver a message M to C. If F were not present between E and C, E could directly connect to C and deliver M. Firewalls like F expressly prohibit external entities like E from connecting "inward" to internal entities like C asynchronously. Firewalls also commonly restrict connections from internal entities like C "outward" to external entities like E.

Firewalls restrict such connections to a small set of Internet protocols; for instance, at one "Big Six" accounting firm, the only protocol allowed by the firewall for connections to external entities is HTTP, the Hyper Text Transport Protocol. Because most firewalls do allow HTTP and there is no other suitable protocol generally allowed by firewalls, all communication within the Flash system between a "firewalled" client and a Flash server must follow the HTTP convention.

Figure 4B:
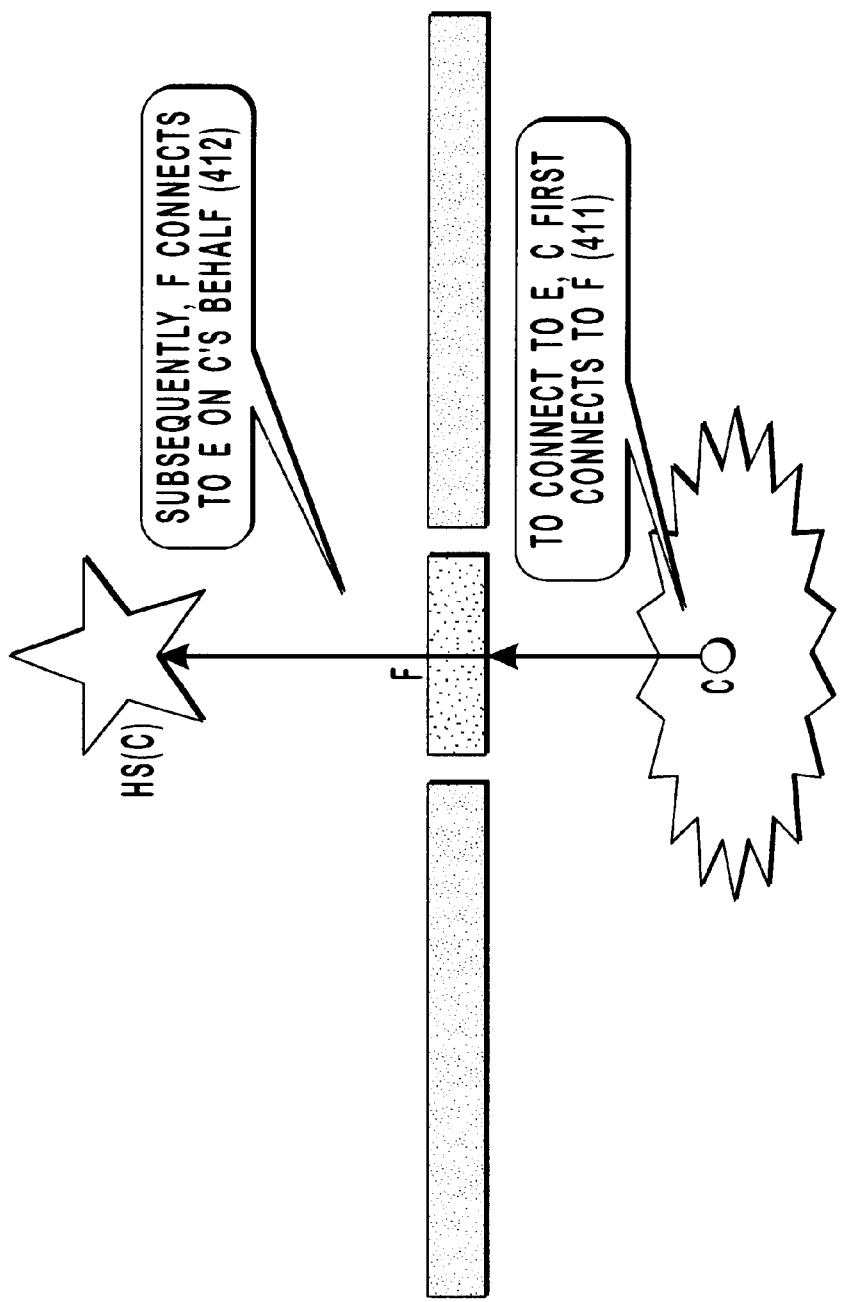
Figure 4C:
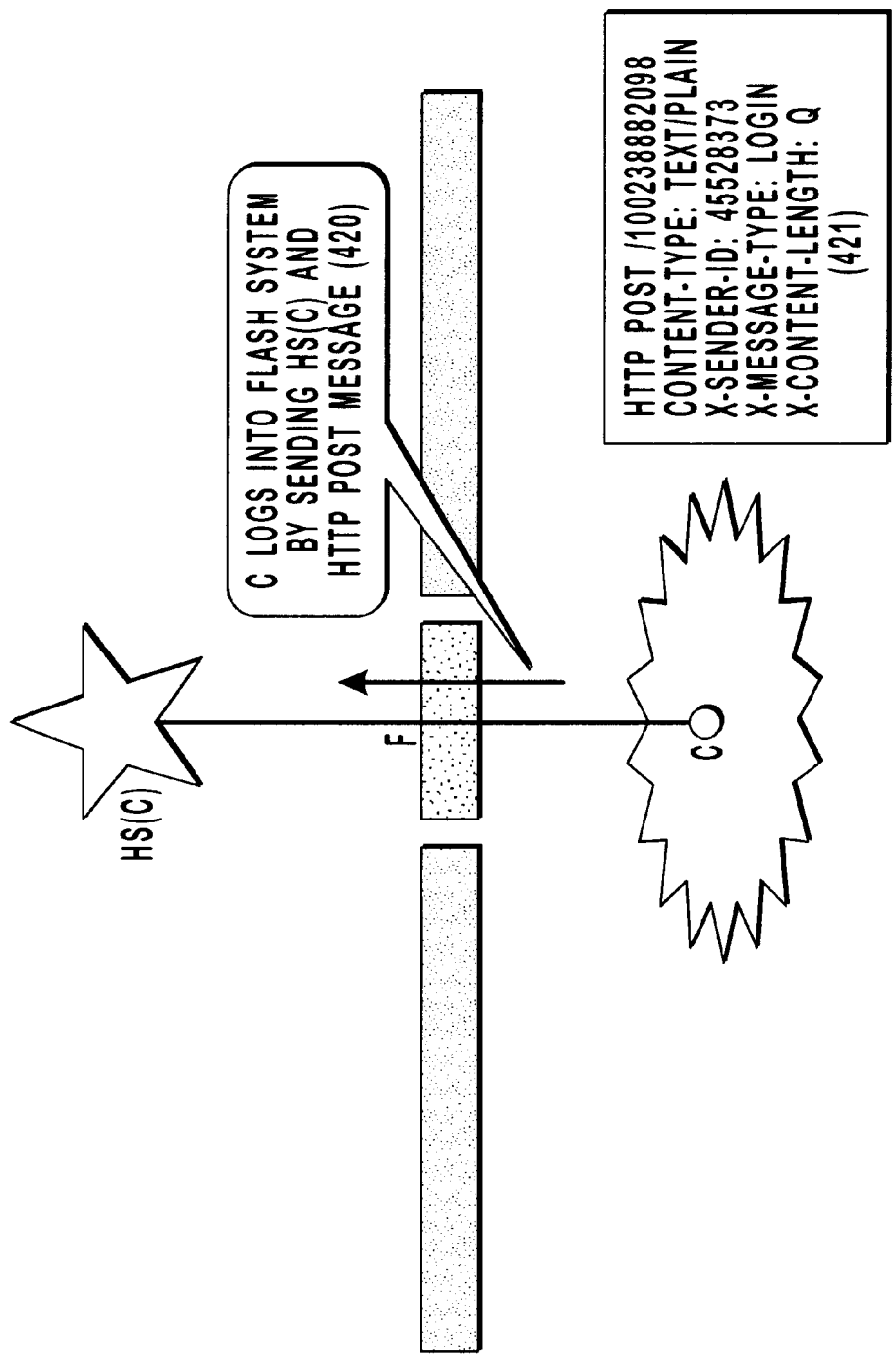
Figure 4D:
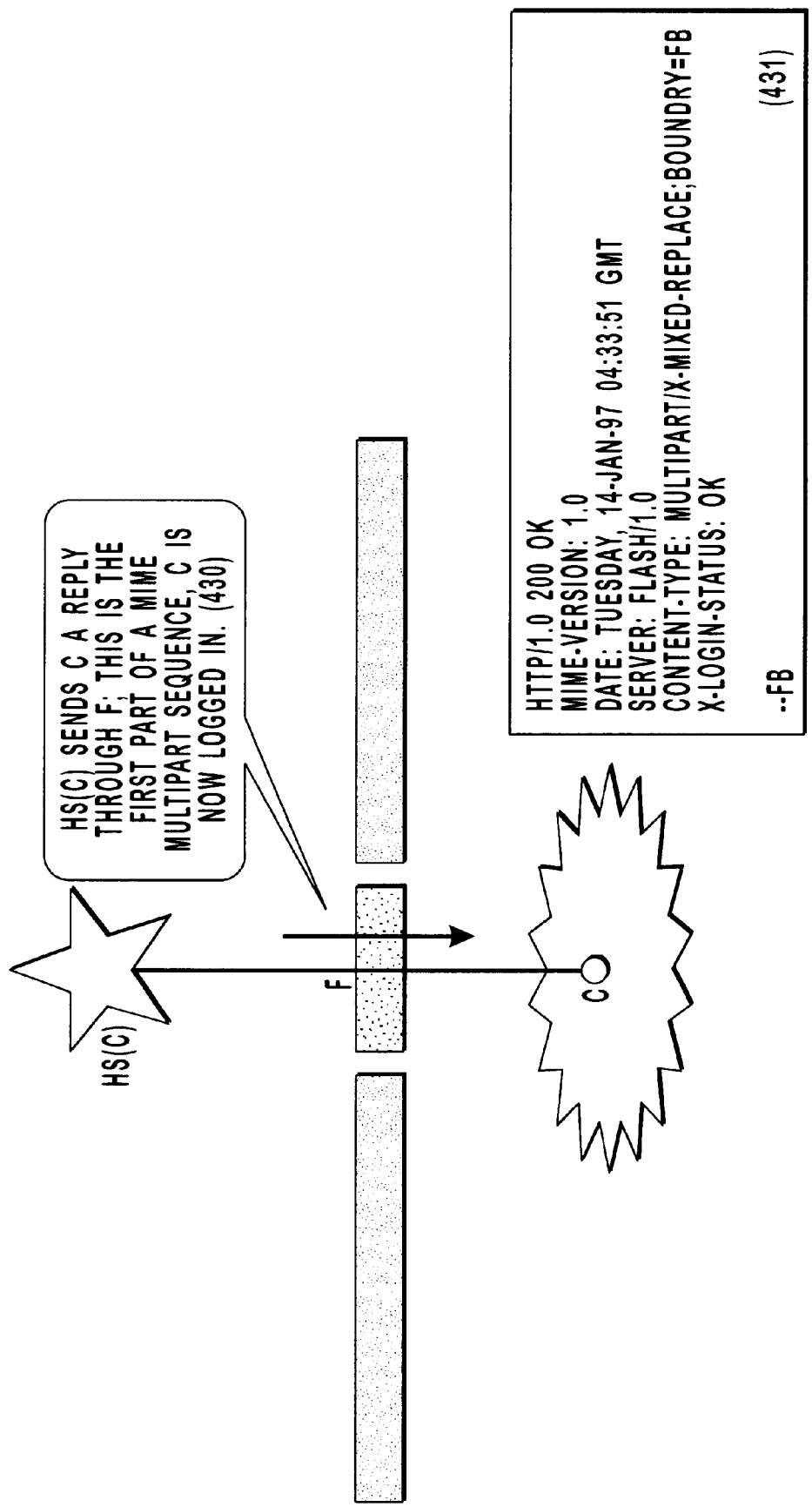
Figure 4E:
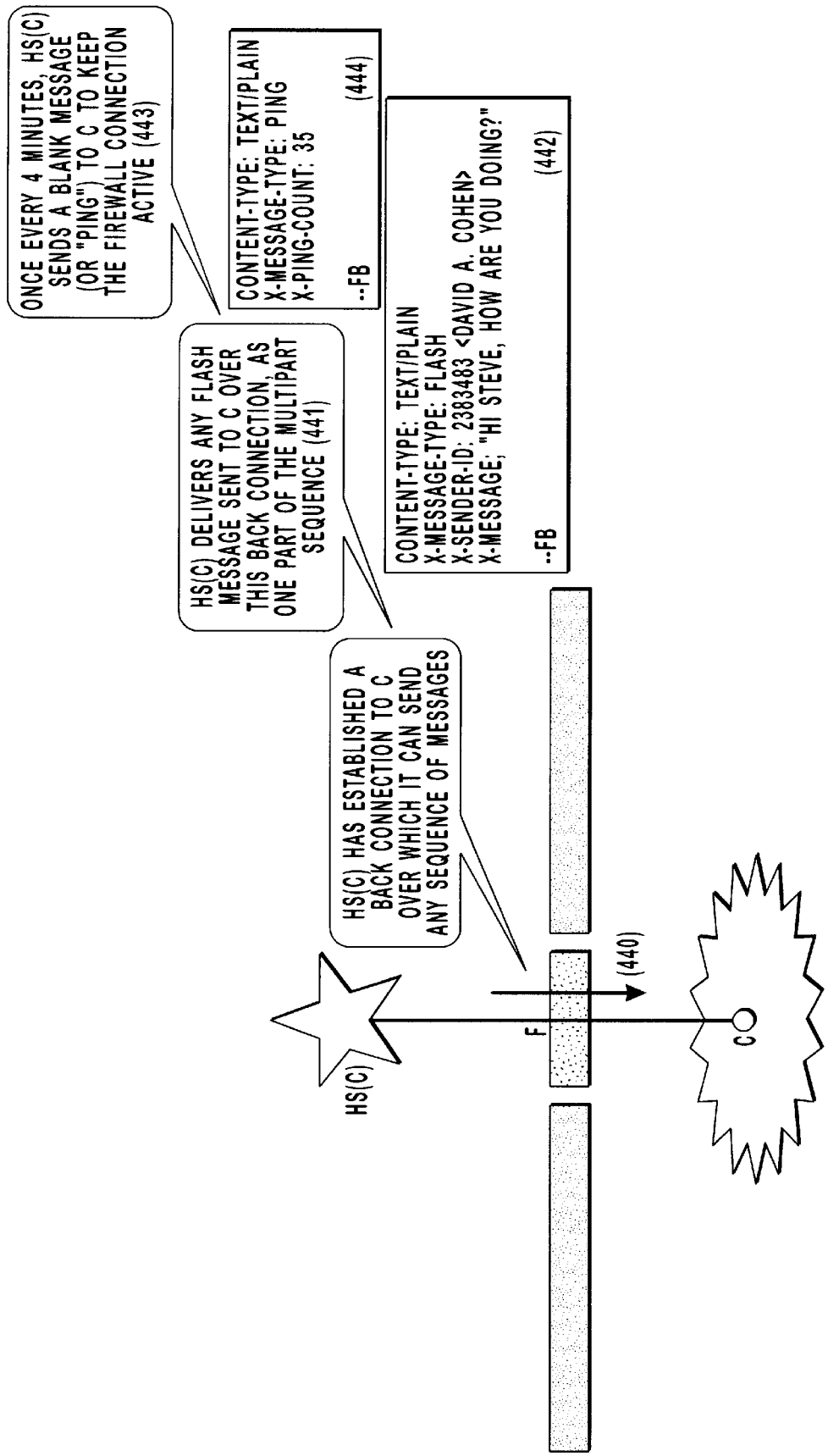

The special firewall technique employed in Flash works as depicted in FIGS. 4B–E. As shown in FIG. 4B, when a client C behind a firewall F logs on to the Flash system, it connects to its Home Server HS(C) through F 411–412. Subsequently, as shown in FIG. 4C, C sends HS(C) an HTTP POST message 421. As shown in FIG. 4D, when HS(C) receives this request, it marks the state of user C as "logged in", and sends it an HTTP response 431 with the MIME-type-field set to "multipart/x-mixed-replace". This is a commonly used technique for "pushing" information to HTTP clients, and is defined in the MIME specification, Internet RFC 1341. Unlike existing push products, Flash uses multipart sequences to send messages to a client. The HTTP response with "multipart/x-mixed-replace" signifies that the response is the first in an arbitrarily long series of messages; as shown in FIG. 4E, HS(C) has now established a back connection 440 to C over which it can send further messages. Since multipart messages are a part of the HTTP specification, and since firewalls are usually compliant with HTTP, HS(C) usually succeeds in establishing a communications channel (the back connection) with C.

Further, HS(C) can, at any time, send a message to C over the back connection; the only requirements are that the back connection be open (the connection will close if the client or server explicitly closes it, e.g. if the client logs out or if there are certain types of network errors) and that the message be formatted in the particular manner illustrated in 431, 442 and 444. With respect to the chain of events that occurs when a user A sends a flash message to user B (summarized in FIG. 3), when HS(B) needs to deliver a message to a logged-in user B, it formats the message in the required manner 442 and sends it on the back connection to B.

Once every 4 minutes, HS(C) sends C a "blank" message 444. This keeps the firewall connection active; if HS(C) doesn't send C such a message, the firewall might time out and close the connection. The interval of 4 minutes has been found, by experimentation, to be the maximal interval that is generally accepted by firewalls without timing out.

Figure 5:
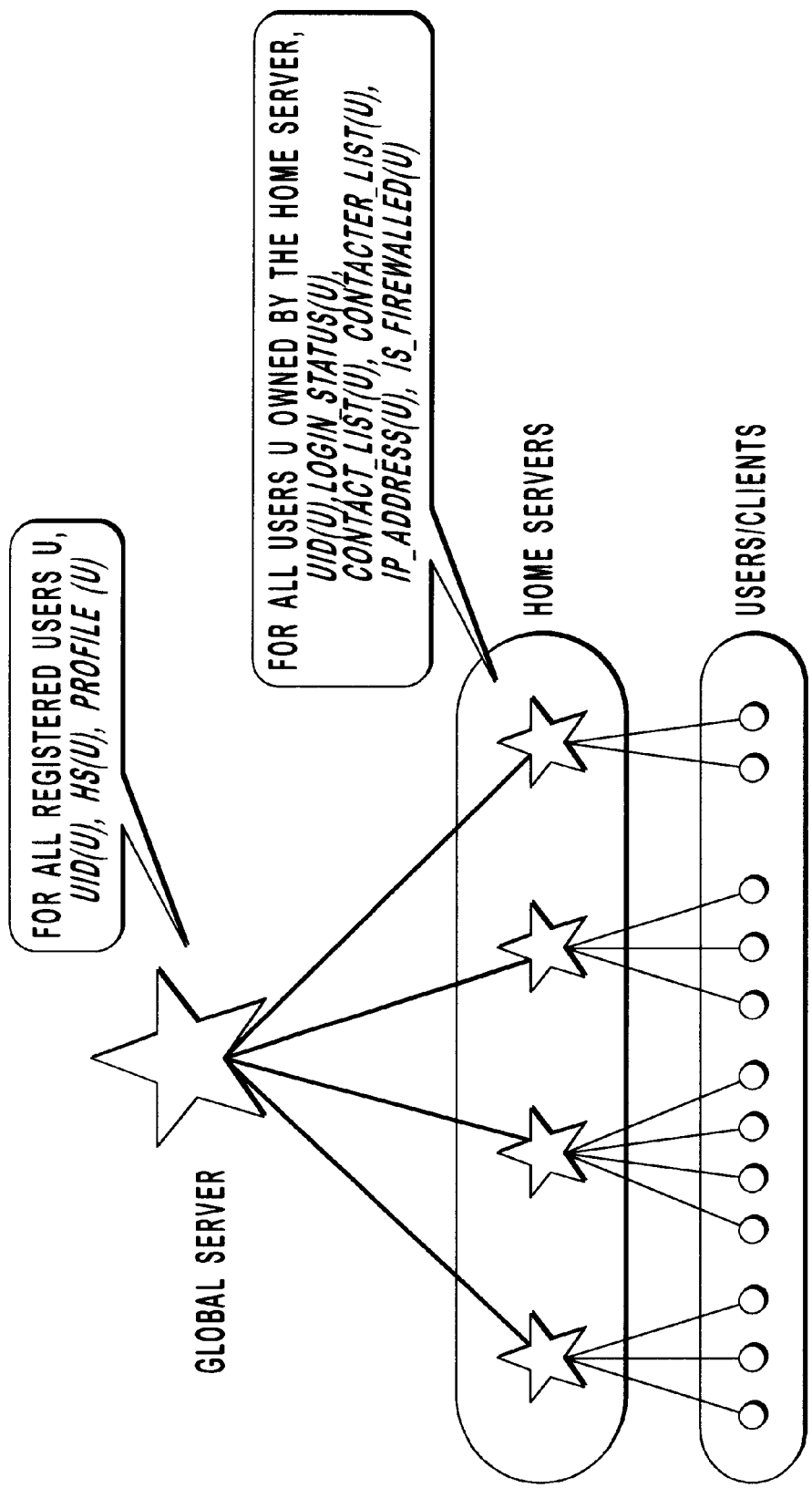
FIG. 5 shows the data maintained by different components of the Flash system.

In the Flash system described above, each message from a user A to another user B passes through HS(B). While this is necessary if B is behind a firewall, direct communication between A and B is possible if B is not behind a firewall. The preferred embodiment also covers optimizations of the basic model described above; in these optimizations, a message is delivered to the intended recipient through the most direct route possible. For each logged-in user U, HS(U) also stores information on the nature of the connection at U—i.e., the U's current IP address, and whether U is behind a firewall. Based on that information, a message to U can either be sent on the back connection to U, if U is behind a firewall, or directly to U at its IP address, if U is not behind a firewall. FIG. 5 illustrates all the data maintained by Home Servers required to enforce such optimizations.

Besides conveying messages between users, another pivotal function performed by the Flash system is managing a "contact list" of other users that a certain user intends to correspond with. The contact list is akin to a phone book that is initially empty and gradually accumulates contact information for correspondents. Initially, a user A's contact list is empty. For A to send a message to another user B, A must first add B to A's contact list. After being initially added to A's contact list, B stays on the list unless explicitly removed by A later. Thus, the contact list is persistent through logoffs and subsequent logins by A.

Another important function performed by the Flash system is tracking members of the contact list. For each user $B_i$ on A's contact list, A is continually kept up-to-date on $B_i$'s login status. This is important for A to know because if $B_i$ is not logged in at a particular instant, $B_i$ cannot receive a message immediately, and will only receive it the next time $B_i$ logs in. A's maintains a "contact window" that displays A's contact list, and next to each member $B_i$ of the contact list, displays whether $B_i$ is logged in. When any user $B_i$ logs in or logs off, A's window immediately changes the displayed status for $B_i$.

FIG. 5 illustrates how Flash manages contact list information and tracking, by specifying the data maintained by different components of the Flash system. For a user A, HS(A) stores A's contact list (more precisely, the UID of each member $B_i$ on A's contact list), A's contacter list (the UID of each member $C_i$ that has A on his/her contact list), and A's current login status (whether "logged in" or "logged off"). As described previously, A connects to HS(A) to log into the Flash system. Upon successful login, HS(A) sends a message to HS($C_i$) for each user $C_i$ in A's contacter list. If $C_i$ is logged in HS($C_i$) in turn sends the message to $C_i$. The client $C_i$ updates the contact window to show A as logged in. Thus, when A logs in, every user $C_i$ who is logged in and who is on A's contacter list is informed of A's logging in.

Similarly, when A logs out, A notifies HS(A), which sends a message to HS($C_i$) for each user $C_i$ in A's contacter list. HS($C_i$), in turn, informs $C_i$. This is the desired logoff sequence, and is termed a "graceful logoff". The Flash system must also handle "non-graceful logoffs," in which a client A suddenly "dies" without contacting the server HS(A). Such situations can arise in several ways, such as a user's machine crashing, the user's abruptly shutting off his/her machine, network failure, etc. The Flash system handles such occurrences through the "blank message" mechanism 444. If a client A crashes suddenly, the next blank message sent by HS(A) to A cannot be delivered, and the underlying TCP/IP stack will inform HS(A) of the fact. HS(A) will then conclude that A is logged off, and will inform each member $C_i$ of A's contacter list immediately, through the member's home server HS($C_i$).

Thus, users are provided with a constantly up-to-date status of every member in their contact list. A user $C_i$ may also request notification through a flash message when a user A on his/her contact list logs in or logs off. The client $C_i$, upon receiving notification from HS($C_i$) in the manner described above, "pops up" a flash message on $C_i$'s screen, informing $C_i$ of the new status of A.

What is claimed is:

1. In a computer messaging system that includes a global server connected to a plurality of home servers each of which are in turn connected to a plurality of client systems, and wherein a firewall is interposed between at least a first said client system and a first home server to which said first client system is connected, a second client system and a second home server to which the second client system is connected, a method for performing immediate point-to-point messaging between said first client system and the second client system, comprising the steps of:

storing on each home server a unique identifier of each client system connected to that home server;

storing on said global server a repository that identities each home server logically connected to the global server and the unique identifier of each client system connected to each said logically connected home server;

initiating from the first client system a request to transmit a message to the second client system;

transmitting the message from the first client system to the firewall, and from the firewall to the first home server;

establishing a back connection from the first home server to the first client server through the firewall;

if the identity of the second home server to which the second client system is connected is not already known by the first home server, then sending an inquiry from the first home server to the global server to discover the identity of the second home server, and receiving at the first home server the identity of the second home server; and once the identity of the second home server is known by the first home server, transmitting the message from the first home server to the second home server, and if the second client system is on line with the second home server, immediately notifying the second client system of the message in order to provide the capability of permitting the second client system to immediately respond to the message by communicating to the first client system via the first home server and the established back connection from the first home server through the firewall to the first client system.

2. A method as defined in claim 1 wherein said step of storing said repository on the global server comprises the step of storing searcheable profile information for each client system to facilitate finding any given client system listed on the repository.

3. A method as defined in claim 1 wherein each home server is assigned a set of client systems that is owned in the sense that they are unique to that home server, and wherein the method is further comprised of the step of utilizing each home server to manage all communication to and from each client system owned by that home server.

4. A method as defined in claim 3 wherein the step of managing all communications to and from each client system owned by a home server is comprised of one or more of the following acts:

storing on each home server the current login status of each owned client system;

storing on each home server messages intended for any owned client system not logged on to its home server when such messages arrive;

for each owned client system, storing on its home server a contact list of other client systems with which an owned client system desires to regularly communicate; and for each owned client system, storing on its home server a list of other client systems which have listed an owned client system on their contact list.

5. A method as defined in claim 4 wherein, once an owned client system is logged onto its home server, the method is further comprised of the step of notifying the logged on client system whenever a client system listed on the logged on client system's contact list is on line with its home server.

6. A method as defined in claim 1 further comprising the step of periodically sending from the first home server a blank message to the first client system when it is logged on, in order to maintain said back connection open so long as the first client system is logged onto the first home server.

7. A computer messaging system for performing immediate point-to-point messaging between a first client system which is logically connected over the internet to a second client system and wherein the first client system is connected to the internet through a firewall that separates the first and second client systems, the system comprising:

a plurality of home servers logically connected to a global server, each said home server being connected to a plurality of client systems, and at least a first client system being connected through a firewall to a first home server;

storage means for storing on each home server a unique identifier of each client system connected to that home server;

storage means for storing on said global server a repository that identifies each home server logically connected to the global server and the unique identifier of each client system connected to each said logically connected home server;

first program code means for initiating from the first client system a request to transmit a message to the second client system;

second program code means for transmitting the message from the first client system to the firewall, and from the firewall to the first home server;

third program code means for establishing a back connection from the first home server to the first client server through the firewall;

fourth program code means for sending an inquiry from the first home server to the global server to discover the identity of the second home server to which the second client system is connected if the identity of the second home server is not already know by the first home server, and for receiving at the first home server the identity of the second home server; and fifth program code means for causing transmission of the message from the first home server to the second home server once the identity of the second home server is known by the first home server, and if the second client system is on line with the second home server, for immediately notifying the second client system of the message in order to provide the capability of permitting the second client system to immediately respond to the message by communicating to the first client system via the first home server and the established back connection from the first home server through the firewall to the first client system.

* * * * *

UNITED STATES PATENT AND TRADEMARK OFFICE
CERTIFICATE OF CORRECTION

PATENT NO. : 5,943,478
DATED : August 24, 1999
INVENTOR(S) : Sudhanshu Aggarwal, Peter Beebee, Kleanthes Koniaris, Rajeev Surati It is certified that error appears in the above-identified patent and that said Letters Patent is hereby corrected as shown below:

Col. 3, ln. 6: after "provide" change "searche-" to --search---

Col. 8, ln. 16: after "already" change "know" to --known--

Signed and Sealed this

Seventh Day of November, 2000

Attest:

Q. TODD DICKINSON

*Attesting Officer*  *Director of Patents and Trademarks*